UNITED STATES PATENT OFFICE.

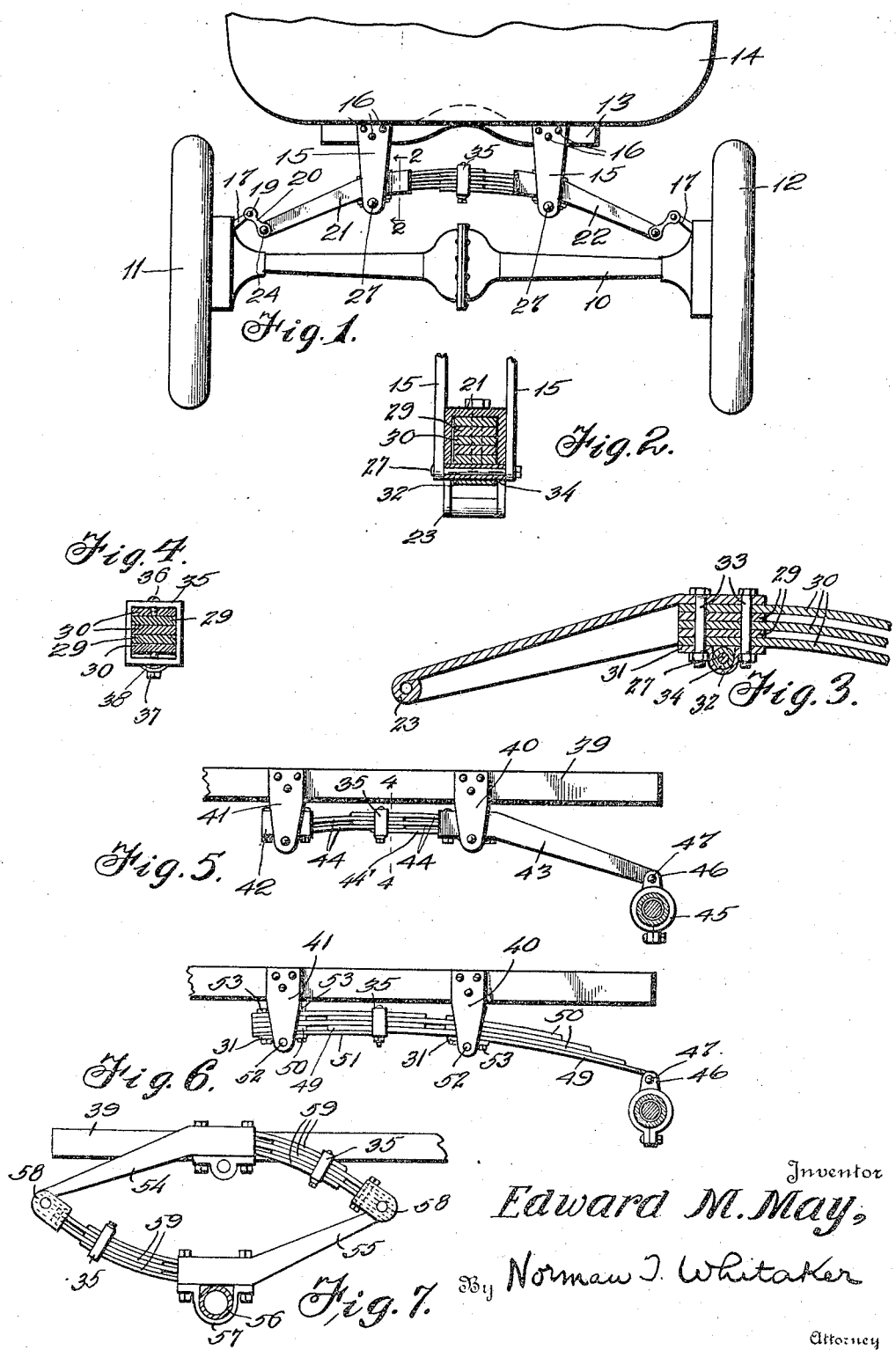

EDWARD M. MAY, OF ANN ARBOR, MICHIGAN.

SHOCK-ABSORBER.

1,242,574.  Specification of Letters Patent.  Patented Oct. 9, 1917.

Application filed April 12, 1916, Serial No. 90,608. Renewed September 1, 1917. Serial No. 189,421.

*To all whom it may concern:*

Be it known that I, EDWARD M. MAY, a citizen of the United States, and resident of the city of Ann Arbor, county of Washtenaw, and State of Michigan, have invented certain new and useful Improvements in Shock-Absorbers, of which the following is a specification.

My invention relates to shock absorbers for motor vehicles or the like.

The primary object of my invention is to provide a shock absorber or spring construction for motor vehicles that will not rebound too suddenly, but will rebound just fast enough to make it comfortable for the occupants of the vehicle.

A second object of the present invention is to provide a spring construction that will not be distorted should the vehicle hit an obstruction.

A further object of my invention is to provide a spring construction which is so arranged that any one of the springs may be removed easily should it be necessary to do so.

A still further object of the invention is to provide a spring construction that may be easily applied to any automobile or the like.

The above and other objects and advantages of my improvement will fully appear from the following description, taken in connection with the accompanying drawings and be explicitly defined in the appended claims.

In the drawings,

Figure 1 is a rear elevation of an automobile showing the manner in which the rear shock absorber is applied.

Fig. 2 is a sectional view on the line 2—2 of Fig. 1.

Fig. 3 is a longitudinal sectional view of one of the channel-shaped members, showing the manner in which the springs are connected therewith.

Fig. 4 is a detail sectional view on the line 4—4 of Fig. 5, showing the arrangement for regulating the friction between the springs, in elevation.

Fig. 5 is a side elevation showing the side bar of the chassis of an automobile and the side shock absorbers connected with the axle of the vehicle and the side bar.

Fig. 6 also shows a side elevation but the shock absorber is shown slightly modified.

Fig. 7 is another modification of the side shock absorber.

Referring more particularly to the drawing, the numeral 10 designates a rear axle of a motor vehicle upon which are mounted the wheels 11 and 12. 13 designates the cross bar of the chassis upon which is mounted the body 14 of the vehicle.

Depending downwardly from the opposite faces of the cross bar 13 and at its ends are the spaced parallel supporting members 15 which are secured to the cross bar 13 by means of screws 16 or the like.

Extending obliquely from the axle 10 are the projections 17. Pivotally connected with these projections 17 as at 19 are the links 20.

Arranged between the supporting members 15 are the longitudinal channel-shaped members 21 and 22. These channel-shaped members are looped upon themselves at their lower ends to provide the loops 23. Extending through the loops 23 and the lower ends of the links 20 are the pins 24.

Secured within the channel-shaped members 21 and 22 at their upper ends is a plurality of superposed leaves 29 and 30. The springs 30 are longitudinally curved and are relatively long, while the members 29 are relatively short and are non-resilient. As clearly shown in Fig. 3, the springs are arranged alternately, a long spring 30 and then a short spacer 29 of non-resilient material. While I have described the members 29 and 30 as being of different lengths, they may all be of the same resilient quality if it is so desired. The inner ends of the springs are arranged within the channel-shaped members at their upper ends. Engaging the bottom spring 30 is a plate 31 having an arcuate seat 32 therein. Extending through the channel-shaped members, the springs 30 and spacers 29 and the plate 31 are the bolts 33. Seated within the seats 32 are the sleeves 34. Extending through the lower ends of the members 15 and through the sleeves 32 are the removable bolts 27. The springs 30 extend out of the open ends of the channel-shaped members and are arranged in overlapping relation and are adapted for longitudinal sliding movement.

Engaging these springs 30 is a band 35 which is preferably rectangular. A setscrew 36 extends through this band and engages the uppermost spring while an adjustable screw 37 carrying a washer 38 extends through the band and bears against the bottommost spring. The purpose of this band 35 and the adjustable screw 37 is to regulate the friction between the springs. It will thus be seen that by turning the screw 37 the friction between the springs may be easily varied. The purpose of the washer 38 is to retain the screw 37 against rotation.

This construction that I have just described is the rear shock absorber. I will now proceed to describe the side shock absorbers.

The numeral 39 designates a longitudinal side bar of the vehicle chassis. Depending downwardly from this side bar are the supporting members 40 and 41 which are identical with the supporting members 15. Mounted between the supporting members 40 is a longitudinal channel-shaped member 43 which is identical with the members 21 and 22. Engaged in the members 42 and 43 and extending therefrom are the superposed longitudinally bowed springs 44, the outer ends of which are arranged in overlapping relation. The opposite ends of these springs are connected with the channel-shaped members 42 and 43 in the same manner as the springs 29 and 30 are connected with the members 21 and 22. Also engaged in the channel-shaped member 43 is a longitudinal plate 44' which extends in parallel relation to the springs 44. This plate 44' is of non-resilient metal. A friction regulating device identical to the one above described is engaged about the springs 44 and member 44'. It will be seen that by providing the non-resilient member 44' which bears against the band 35 that the band is not subjected to any strain.

Engaged upon the axle 10 is a detachable collar 45 having an upwardly extending perforated ear extending therefrom. A pin 47 pivotally connects the ear 46 with the lower end of the channel-shaped member 43.

Fig. 6 shows a slightly modified form of the side shock absorber. Referring to this figure the numerals 40 and 41 indicate the downwardly extending supporting members. Arranged between these members 40 and 41 are the springs 49 and spacer members. The inner ends of the springs 49 extend toward each other and are arranged in overlapping relation while the members 50 are relatively short. These springs are arranged alternately, a long spring 49 and then a short spacer member 50. Arranged upon the bottommost spacer member 50 and extending parallel with the same is a non-resilient member 51. Engaged upon the under face of the member 51 and the under face of the bottommost spring 49 and connected with the supporting members 40 and 41 as at 52 are the plates 31. Extending through the springs 49 and 50, the member 51 and the plates 31 are the bolts 53. Engaged about the ends of the members 49 and 50 and the member 51 is a friction regulating device 35.

Fig. 7 shows another modification of the side shock absorbers. Referring to this figure the numeral 54 indicates a channel-shaped member which is connected with the side bar 39 of the chassis. A channel-shaped member 55 is arranged upon a vehicle axle 56 and is connected thereto by means of an arcuate strap 57. Pivotally connected with the outer ends of the members 54 and 55 are the open ended members 58. Secured within the members 54 and 55 and 58 and extending out of the open ends thereof is a plurality of overlapping springs 59. Engaged about these overlapping springs are the friction regulating devices 35.

From the above description it will become apparent that should the vehicle hit an obstruction, the springs will slide upon each other, thus being prevented from being distorted. It will also be seen that when the vehicle hits an obstruction the springs will not rebound too suddenly owing to the friction between the springs.

While I have set forth the preferred embodiments of my invention, I wish it understood, however, that this disclosure is only illustrative and that the principle of my invention can be embodied in constructions other than the ones specified.

Having described my invention what I believe to be new and desire to secure and protect by Letters Patent of the United States is:

1. The combination with a supported axle, of longitudinally bowed channel-shaped members pivotally connected with the axle at their lower ends, a vehicle chassis having connection with the channel-shaped members at their upper ends, and a plurality of superposed springs extending from the channel-shaped members and arranged in overlapping relation.

2. The combination with a supported axle and a vehicle chassis, of channel-shaped members having their lower ends pivotally connected with the outer ends of the axle and their upper ends extended toward each other, said upper ends being operatively connected with the chassis, and a plurality of springs extending from the channel-shaped members and arranged in overlapping relation, said springs being capable of longitudinal movement.

3. The combination with a supported axle and a vehicle chassis, of channel-shaped members having their lower ends pivotally connected with the opposite ends of the axle and their upper ends operatively connected with the chassis, the upper ends of the channel-shaped members being open, and leaf springs extending from the open ends of the channel-shaped members and arranged in overlapping relation, said springs being capable of longitudinal movement.

4. The combination with a supported axle and a vehicle chassis, of channel-shaped members having their lower ends pivotally connected with the axle and their upper ends extended toward each other, said upper ends being operatively connected with the vehicle chassis, and a plurality of overlapping springs extending from the channel-shaped members.

5. The combination with a supported axle and a vehicle chassis, of spaced parallel supporting members depending from the chassis, channel-shaped members pivotally connected with the axle and extending between the supporting members, means passing through the supporting members and pivotally connecting the upper ends of the channel-shaped members, and overlapping springs extending from the channel-shaped members.

EDWARD M. MAY.